(12) United States Patent
Ng et al.

(10) Patent No.: US 9,251,857 B2
(45) Date of Patent: Feb. 2, 2016

(54) METHOD OF PREDICTING A NOISE COMPONENT ASSOCIATED WITH A READBACK SIGNAL FROM A DEDICATED SERVO MEDIUM, NOISE PREDICTOR THEREOF, AND HARD DISK DRIVE SYSTEM

(71) Applicant: Marvell International LTD., Hamilton (BM)

(72) Inventors: Yibin Ng, Singapore (SG); Kheong Sann Chan, Singapore (SG); Anmin Kong, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/697,009

(22) Filed: Apr. 27, 2015

(65) Prior Publication Data
US 2015/0310890 A1  Oct. 29, 2015

(30) Foreign Application Priority Data

Apr. 28, 2014  (SG) .............................. 10201401883S

(51) Int. Cl.
*G11B 27/36* (2006.01)
*G11B 20/10* (2006.01)
*G11B 5/012* (2006.01)
*G11B 20/12* (2006.01)

(52) U.S. Cl.
CPC ................ *G11B 27/36* (2013.01); *G11B 5/012* (2013.01); *G11B 20/10268* (2013.01); *G11B 20/10388* (2013.01); *G11B 20/10462* (2013.01); *G11B 20/1252* (2013.01); *G11B 2020/1281* (2013.01); *G11B 2220/20* (2013.01)

(58) Field of Classification Search
CPC .... G11B 27/36; G11B 5/012; G11B 2220/20; G11B 5/6005; G11B 20/10296; G11B 2220/2516; G11B 20/10046; G11B 20/10175; G11B 20/24; G11B 20/10212
USPC .................................... 360/31, 48, 39, 69, 75
See application file for complete search history.

(56) References Cited

U.S. PATENT DOCUMENTS 7,643,238 B2 * 1/2010 DeGroat .......... G11B 20/10046
360/31

* cited by examiner

*Primary Examiner* — Ali Neyzari

(57) ABSTRACT

There is provided a method of predicting a noise component associated with a readback signal in a channel from a dedicated servo medium including a data recording layer and a dedicated servo layer. The method including: providing at least one noise prediction module for each of a plurality of types of servo patterns of the servo layer, and predicting the noise component by, for each of a plurality of segments of the readback signal of the data recording layer, using a selected one of the noise prediction modules. In particular, the selected one of the noise prediction module for a segment of the readback signal is selected based on the type of the servo pattern associated with the segment of the readback signal. There is also provided a corresponding noise predictor, a method of detecting data bits from the readback signal, and a hard disk drive system.

26 Claims, 10 Drawing Sheets

METHOD OF PREDICTING A NOISE COMPONENT ASSOCIATED WITH A READBACK SIGNAL FROM A DEDICATED SERVO MEDIUM, NOISE PREDICTOR THEREOF, AND HARD DISK DRIVE SYSTEM

CROSS-REFERENCE TO RELATED APPLICATION

This application claims the benefit of priority of Singapore Patent Application No. 10201401883S, filed 28 Apr. 2014, the content of which being hereby incorporated by reference in its entirety for all purposes.

TECHNICAL FIELD

The present disclosure generally relates to a method of predicting a noise component associated with a readback signal in a channel from a dedicated servo medium, a noise predictor for predicting a noise component associated with the readback signal, a method of detecting data bits from the readback signal, and a hard disk drive system comprising the noise predictor.

BACKGROUND

To support higher capacities in data storage, multi-level recording media has been proposed by adding a dedicated servo recording layer in between the conventional perpendicular data recording layer and the conventional soft-underlayer (SUL). The dedicated servo medium is proposed to achieve a much higher track density in hard disk drive (HDD) systems. This is because nearly the entire surface of the data recording layer can be dedicated for data recording, thus achieving a greater storage capacity.

In the servo layer of the dedicated servo medium, a servo pattern is used to generate position feedback signals, also known as position error signals (PES). However, the servo pattern introduces various distortions to the readback signal of the data recorded on the data recording layer, including linear and non-linear distortions. The two main sources of non-linear distortions are: 1) servo signal induced transition shift at the data recording layer, and 2) transitions of servo signal from one type of servo pattern to another type of servo pattern, causing a baseline jump in the readback signal of the data recording layer.

Regarding the transition shift at the data recording layer, a DC+ bit in the servo layer expands the bit length of a positively magnetized bit in the data recording layer. Similarly, a DC− bit in the servo layer expands the bit length of a negatively magnetized bit in the data recording layer. The result is a non-linear transition shift (NLTS) effect on the readback signal of the data recording layer. This NLTS effect also results in a non-zero mean on the overall noise affecting the readback signal of the data recording layer.

A data-dependent noise prediction (DDNP) detector has been proposed to combat media noise in magnetic recording channels. DDNP is a near maximum-likelihood sequence detection (MLSD) scheme for zero-mean, data-dependent, finite-memory Gauss-Markov noise. Mean-adjusted DDNP (MA-DDNP) was subsequently developed for use on channels affected by NLTS with non-zero mean noise.

However, it has been found that the above conventional techniques do not (or at least do not sufficiently) address the distortion in the readback signal due to transitions of the servo signal from one type of servo pattern to another type of servo pattern (which causes a baseline jump in the readback signal of the data recording layer).

SUMMARY

A method according to the present disclosure predicts a noise component associated with a readback signal in a channel from a dedicated servo medium comprising a data recording layer and a dedicated servo layer. The method includes providing at least one noise prediction module for each of a plurality of types of servo patterns of the servo layer, and predicting the noise component by, for each of a plurality of segments of the readback signal of the data recording layer, using a selected one of the noise prediction modules. The selected one of the noise prediction module for a segment of the readback signal is selected based on the type of the servo pattern associated with the segment of the readback signal.

In other features, the servo pattern associated with the segment of the readback signal is the servo pattern being read from the servo layer when the segment of the readback signal is being generated from the data recording layer.

In other features, each noise prediction module is configured for a particular type of the plurality of types of servo patterns, and the each noise prediction module comprises a plurality of predictor parameter sets, each predictor parameter set predetermined for a particular type of data pattern of the readback signal and the particular type of servo pattern.

In other features, each predictor parameter set comprises a predictor coefficient and a predictor error variance predetermined for the particular type of data pattern and the particular type of servo pattern, and the predictor parameter set is used in determining the noise component associated with the readback signal in the channel.

In other features, the predictor parameter sets are organized in the form of a look-up table.

In other features, each of the plurality of types of servo patterns is assigned a respective servo bit, and the selected one of the noise prediction module for the segment of the readback signal is selected based on the servo bit of the type of the servo pattern associated with the segment of the readback signal.

In other features, the servo bit of the type of servo pattern associated with the segment of the readback signal is identified from the segment of the readback signal or a position error signal from the servo layer.

In other features, the servo bit of the type of servo pattern associated with the segment of the readback signal is identified from the segment of the readback signal by generating a waveform based on the segment of the readback signal and aligning the waveform with the segment of the readback signal.

In other features, one noise prediction module is provided for each of the plurality of types of servo patterns of the servo layer.

In other features, a plurality of noise prediction modules is provided for each of the plurality of types of servo patterns of the servo layer.

In other features, each type of servo pattern is partitioned into a plurality of segments, and the at least one noise prediction module comprises a plurality of noise prediction modules, each noise prediction module configured for a particular segment of the type of servo pattern.

In other features, the plurality of types of servo patterns comprises a DC−/DC+ servo pattern, a DC− servo pattern, a DC+/DC− servo pattern and a DC+ servo pattern.

A noise predictor according to the present disclosure predicts a noise component associated with a readback signal in a channel from a dedicated servo medium comprising a data recording layer and a servo layer. The noise predictor includes at least one noise prediction module for each of a plurality of types of servo patterns of the servo layer. A selection module is configured to, for each of a plurality of segments of the readback signal of the data recording layer, select one of the noise prediction modules for predicting the noise component. The selected one of the noise prediction module for a segment of the readback signal is selected based on the type of the servo pattern associated with the segment of the readback signal.

In other features, the servo pattern associated with the segment of the readback signal is the servo pattern being read from the servo layer when the segment of the readback signal is being generated from the data recording layer.

In other features, each noise prediction module is configured for a particular type of the plurality of types of servo patterns, and the each noise prediction module comprises a plurality of predictor parameter sets, each predictor parameter set predetermined for a particular type of data pattern of the readback signal and the particular type of servo pattern.

In other features, each predictor parameter set comprises a predictor coefficient and a predictor error variance predetermined for the particular type of data pattern and the particular type of servo pattern, and the predictor parameter set is used in determining the noise component associated with the readback signal in the channel.

In other features, the predictor parameter sets are organized in the form of a look-up table.

In other features, each of the plurality of types of servo patterns is assigned a respective servo bit, and the selected one of the noise prediction module for the segment of the readback signal is selected based on the servo bit of the type of the servo pattern associated with the segment of the readback signal.

In other features, the servo bit of the type of servo pattern associated with the segment of the readback signal is identified from the segment of the readback signal or a position error signal from the servo layer.

In other features, the servo bit of the type of servo pattern associated with the segment of the readback signal is identified from the segment of the readback signal by generating a waveform based on the segment of the readback signal and aligning the waveform with the segment of the readback signal.

In other features, one noise prediction module is provided for each of the plurality of types of servo patterns of the servo layer.

In other features, a plurality of noise prediction modules is provided for each of the plurality of types of servo patterns of the servo layer.

In other features, each type of servo pattern is partitioned into a plurality of segments, and the at least one noise prediction module comprises a plurality of noise prediction modules, each noise prediction module configured for a particular segment of the type of servo pattern.

In other features, the plurality of types of servo patterns comprises a DC−/DC+ servo pattern, a DC− servo pattern, a DC+/DC− servo pattern and a DC+ servo pattern.

A method according to the present disclosure detects data bits from a readback signal in a channel from a dedicated servo medium comprising a data recording layer and a servo layer. The method of detecting data bits is based on a noise component associated with the readback signal predicted by the method described above.

A hard disk drive system according to the present disclosure includes a dedicated servo medium comprising a data recording layer and a servo layer. A read head is operable to read data from the data recording layer and generate a readback signal of the data in a channel. A signal processing module configured to process the readback signal in the channel to output data bits detected from the readback signal, wherein the signal processing module comprises noise predictor according to the above-mentioned second aspect of the present disclosure for predicting a noise component associated with the readback signal in the channel.

BRIEF DESCRIPTION OF THE DRAWINGS

The present disclosure will be better understood and readily apparent to one of ordinary skill in the art from the following written description, by way of example only, and in conjunction with the drawings, in which.

DETAILED DESCRIPTION

The present disclosure provides a method of predicting a noise component associated with a readback signal in a channel from a dedicated servo medium for enhancing the accuracy of the data bits detected from the readback signal.

Figure 1:
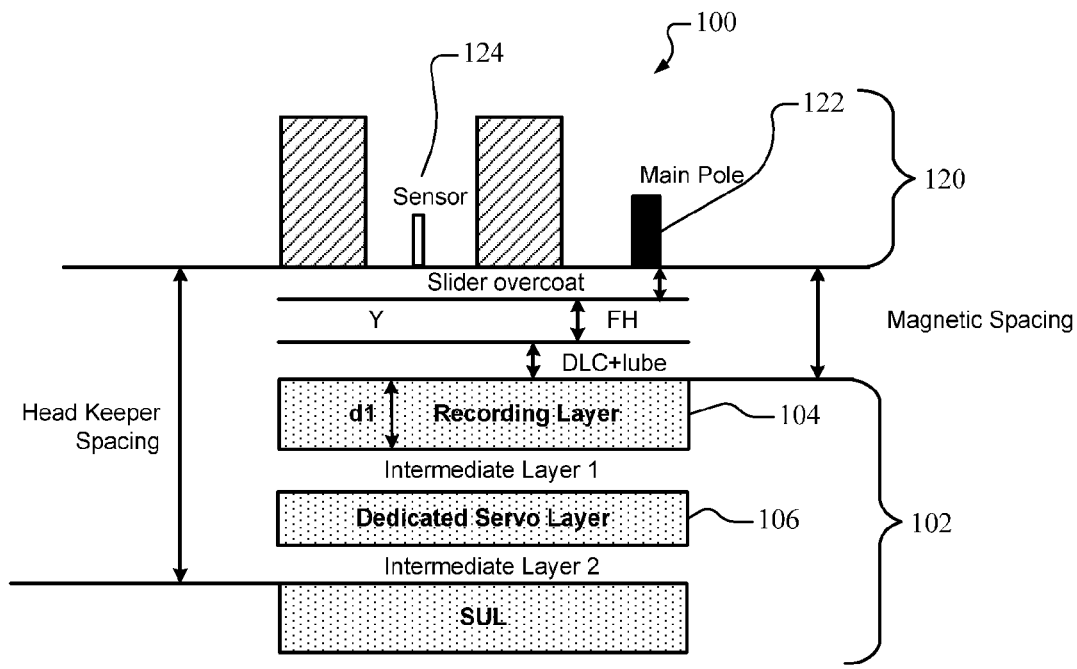
FIG. 1 depicts a schematic cross-sectional view of an example of a portion of an hard disk drive according to the present disclosure.

For illustration purposes only, FIG. 1 depicts a schematic cross-sectional view of a portion of an hard disk drive 100 according to an example of the present disclosure. The hard disk drive 100 comprises a dedicated servo medium 102 including a data recording layer 104 for storing data thereon and a dedicated servo layer 106 for storing servo information thereon. The hard disk drive 100 further comprises a magnetic head 120 including a recording/writing head 122 for recording/writing data to the data recording layer 104 and a reproducing/reading head 124 for reproducing/reading data on the data recording layer 104 and generating a readback signal of the data read.

As explained in the background of the present disclosure, a servo pattern is stored on the servo layer 106 and used to generate position feedback signals, also known as position error signals (PES). However, the servo pattern introduces various distortions to the readback signal of the data recorded on the data recording layer 104, including linear and non-linear distortions. In particular, the two main sources of non-linear distortions are: 1) servo signal induced transition shift at the data recording layer, and 2) transitions of servo signal from one type of servo pattern to another type of servo pattern, causing a baseline jump in the readback signal of the data recording layer.

Figure 2:
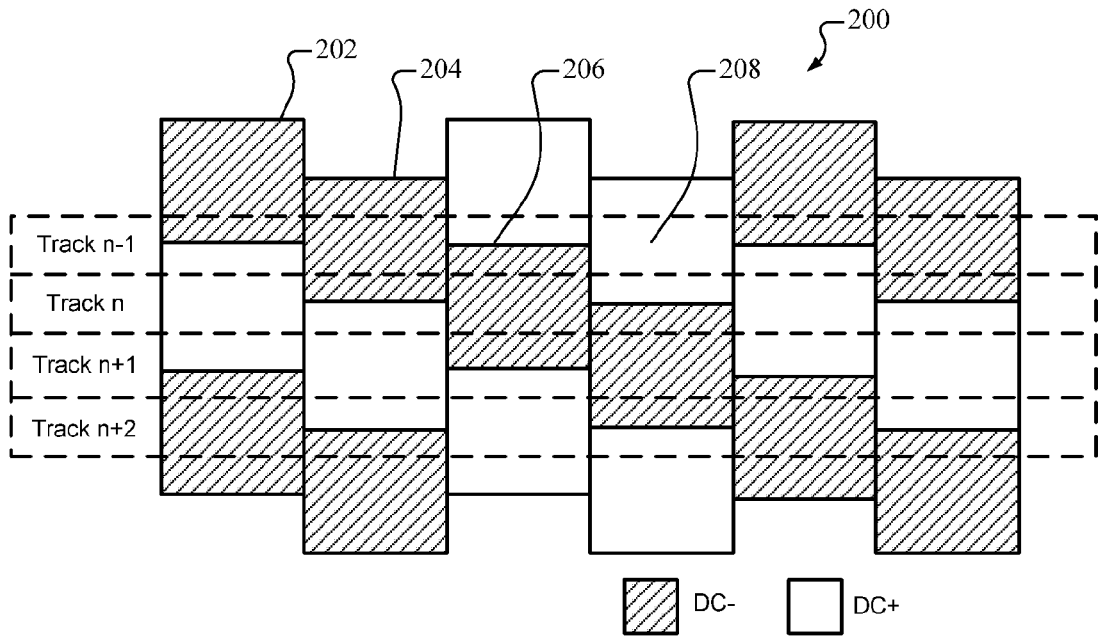
FIG. 2 depicts a schematic drawing of an example of a servo pattern stored on the servo layer according to the present disclosure.
Figure 3:
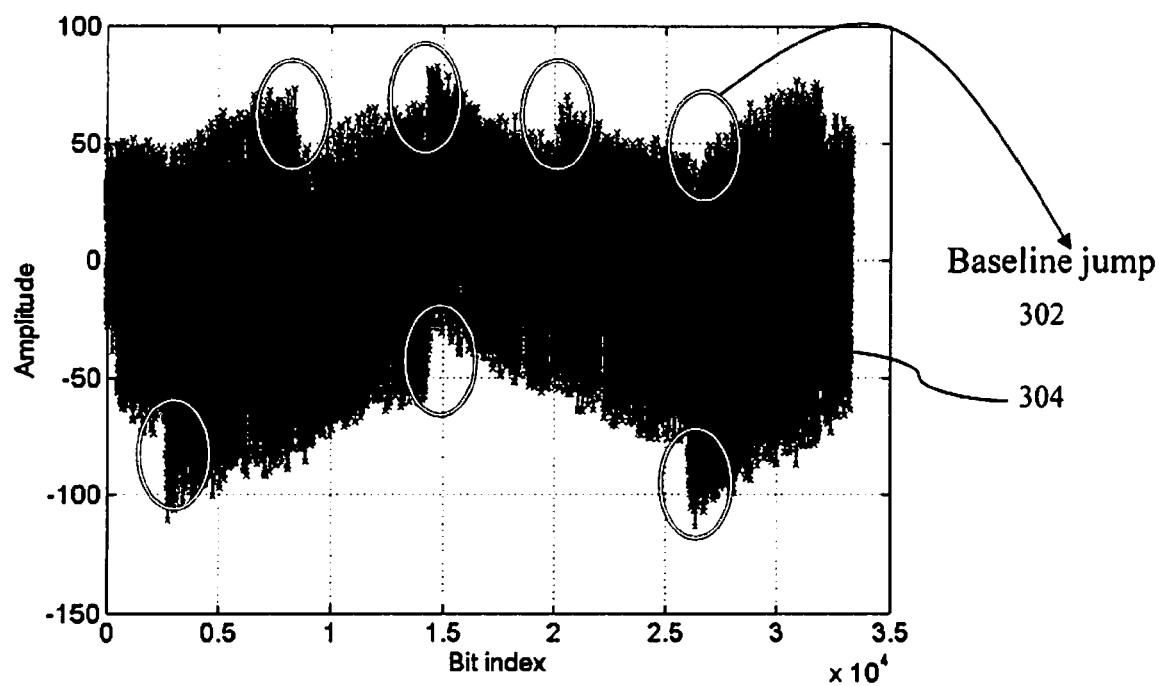
FIG. 3 depicts a graph illustrating an example of the waveform of a readback signal affected by the baseline jumps caused by the transitions of the servo signal of the staggered servo pattern.

As an illustration, FIG. 2 depicts a schematic drawing of a servo pattern 200 stored on the servo layer 106 according to an example of the present disclosure. In this example, the servo pattern 200 is a staggered servo pattern. In particular, each period of the servo pattern 200 has four types of servo patterns, namely, a DC−/DC+ servo pattern 202, a DC− servo pattern 204, a DC+/DC− servo pattern 206 and a DC+ servo pattern 208. For this servo pattern 200, it has been found that transitions of the servo signals from, for example, DC+/DC− servo pattern 206 to DC+ servo pattern 208 or DC− servo pattern 204 causes a baseline jump in the readback signal of the data recording layer 104. FIG. 3 depicts a graph illustrating the waveform of a readback signal 304 affected by the above-described baseline jumps 302 caused by the transitions of the servo signal of the staggered servo pattern 200. Embodiments of the present disclosure advantageously mitigate such a distortion in the readback signal, thereby enhancing the accuracy of the data bits detected from the readback signal.

It will be appreciated that the servo pattern written/stored on the servo layer is not limited to the staggered servo pattern as shown in FIG. 2, which is provided merely for illustration purposes only. Other configurations of servo pattern may be stored on the servo layer as desired or as appropriate. However, for the purposes of brevity and clarity, examples of the present disclosure described herein will be based on the servo pattern as shown in FIG. 2 unless stated otherwise.

Figure 4:
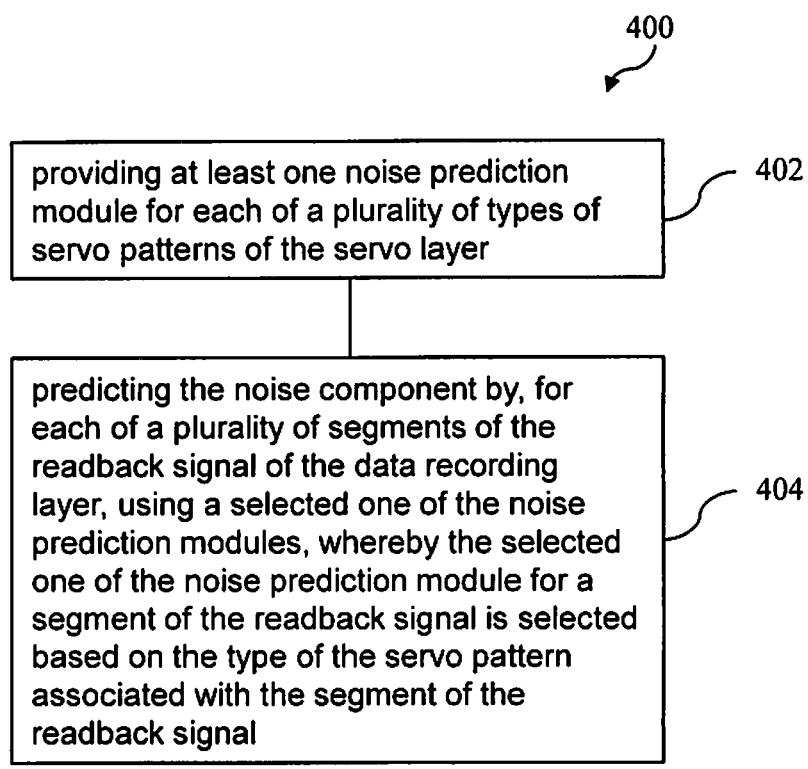
FIG. 4 depicts an overview of an example of a method of predicting a noise component associated with a readback signal in a channel from a dedicated servo medium.

FIG. 4 depicts an overview of a method 400 of predicting a noise component associated with a readback signal in a channel from a dedicated servo medium 102 comprising a data recording layer 104 and a servo layer 106. The method 400 comprises a step 402 of providing at least one noise prediction module for each of a plurality of types of servo patterns of the servo layer 106, and a step 404 of predicting the noise component by, for each of a plurality of segments of the readback signal of the data recording layer 104, using a selected one of the noise prediction modules. In particular, the selected one of the noise prediction module for a segment of the readback signal is selected based on the type of the servo pattern associated with the segment of the readback signal. Therefore, according to the method 400, the noise prediction is not only dependent on the data pattern of the data recording layer 104 as in the conventional data-dependent noise prediction (DDNP) detector, but is also dependent on the polarity of the servo pattern. In particular, by configuring different noise prediction modules for different types of servo patterns of the servo layer 106, and using a selected one of the noise prediction module for a segment of the readback signal based on the type of the servo pattern associated with such a segment of the readback signal (that is, the servo pattern being read from the servo layer when such a segment of the readback signal is being generated from the data recording layer), the above-mentioned distortion to the readback signal due to the transitions of the servo signal from one type of servo pattern to another type of servo pattern can be mitigated. Accordingly, the accuracy of the data bits detected from the readback signal can be significantly improved, which will be demonstrated later according to examples of the present disclosure. The noise prediction according to various examples of the present disclosure may also be referred to as servo and data-dependent noise prediction (SDDNP), since the noise prediction is dependent on both the servo pattern and the data pattern.

Figure 5:
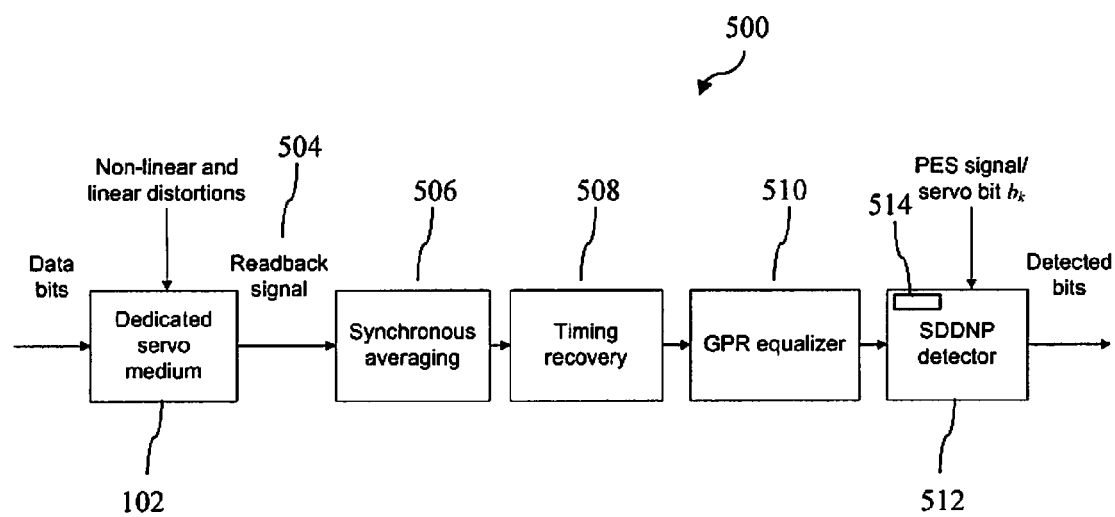
FIG. 5 depicts a schematic block diagram of an example of a method of detecting data bits from a readback signal in a channel from a dedicated servo medium according to the present disclosure.

For a better understanding, the method 400 will now be described more fully according to examples of the disclosure. It will be appreciated that this disclosure may, however, be embodied in many different forms and should not be construed as limited to the examples set forth herein. Rather, these examples are provided so that this disclosure will be thorough and complete, and will fully convey the scope of the disclosure to those skilled in the art FIG. 5 depicts a schematic block diagram of a method 500 of detecting data bits from a readback signal 504 in a channel from a dedicated servo medium 102 according to an example of the present disclosure. As described in the background of the present specification, the servo pattern introduces various distortions to the readback signal 504 of the data recording layer, including linear and non-linear distortions. As an example, the waveform of the readback signal 504 obtained from the spinstand may be as depicted in FIG. 3 mentioned hereinbefore. This may correspond to one sector of data bits of length 32768, with an additional 511 pre-amble bits and 10 post-amble bits. As can be seen from FIG. 3, the readback signal is severely distorted due to the combined effects of servo signal and AC coupling.

Figure 6:
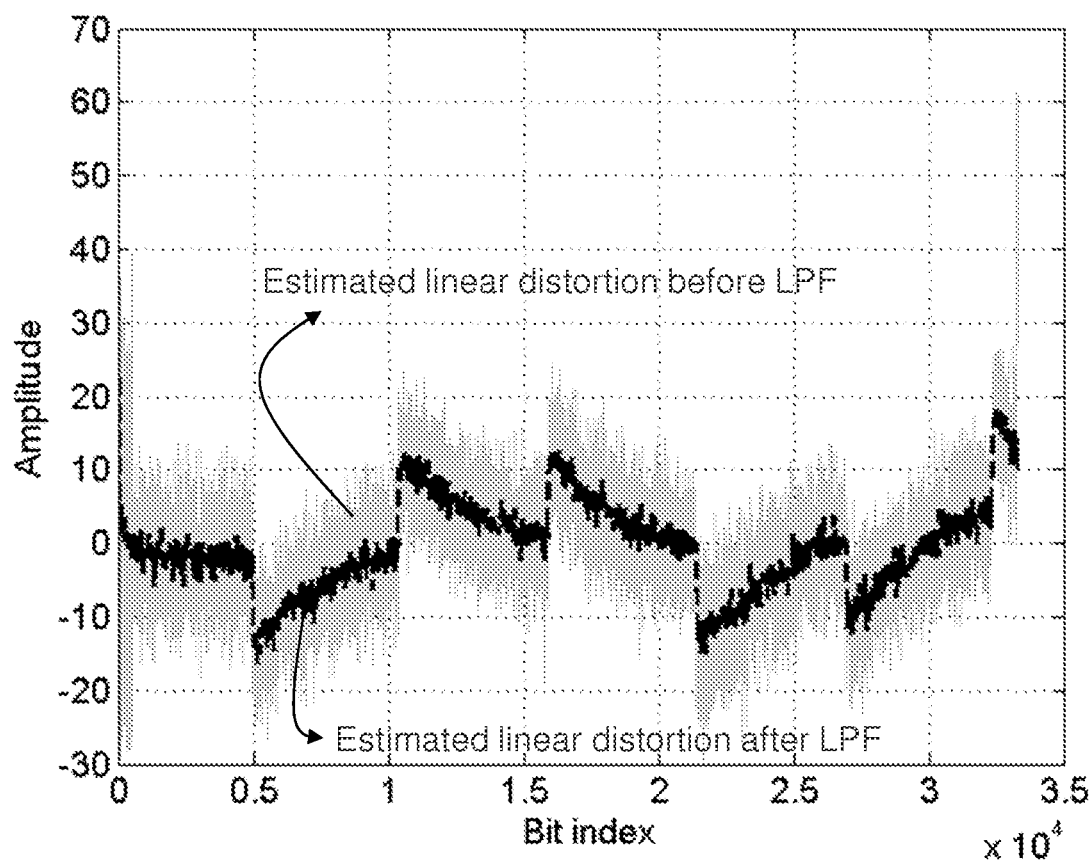
FIG. 6 illustrates an example of the linear distortion before and after low-pass filter (LPF) in relation to synchronous averaging performed on the readback signal for removing the linear distortion in the readback signal according to the present disclosure.

In the example of FIG. 5, synchronous averaging 506 is first performed on the readback signal 504 to remove the linear distortion in the readback signal 504. Synchronous averaging 506 includes averaging together sections of the readback signal waveform 504 with a period equal to the servo pattern of the underlying servo layer. The sections of the waveform are then aligned synchronously with one another using the position error signal (PES). This captures the servo layer pattern with the effect on the data layer averaged out over many repetitions. Once the average signal level of the servo layer is known, it is then passed through a low-pass filter (LPF) to remove the high frequency distortions, and subsequently it is subtracted from each waveform to remove the linear distortion introduced by the servo layer. As an illustrative example, FIG. 6 shows the estimated linear distortion before and after LPF. As can be observed, the estimated linear distortion after LPF captures the distortions of the readback signal (as shown in FIG. 3) well.

Subsequently, the timing recovery block 508 converts the continuous-time waveform into a discrete-time waveform. In general, as known in the art, the purpose of the timing recovery block is to ensure that the sampling instant of each sample in the sequence is correct, or close to correct. If the timing instant is not correct, the value of the sample will not be accurate and the error rate will be much worse. Further, the discrete-time waveform is then input to a generalized partial response (GPR) equalizer 510, which helps to mitigate noise effects such as intersymbol-interference (ISI) and media noise. For example, the GPR equalizer 510 is designed based on the minimum mean square error (MMSE) criterion with monic constraint. In general, also as known in the art, the GPR equalizer 510 shapes the channel response to a known response that the bit detector 512 can then work on. If the signal is left unshaped (i.e., without an equalizer), the bit detector 512 will either perform poorly, or need many more states in order to accurately capture the ISI introduced in the channel.

Thereafter, a bit detector (SDDNP detector) 512 is provided to detect the data bits from the readback signal 504, whereby the bit detector 512 comprises a noise predictor 514 configured to predict a noise component associated with the readback signal according to the method 400 of FIG. 4, that is, servo and data-dependent noise prediction (SDDNP).

For a better understanding, the conventional mean-adjusted data-dependent noise prediction (MA-DDNP) will first be described. Subsequently, the MA-DDNP technique is modified to include the dependency to the servo pattern according to an example of the present disclosure (i.e., SDDNP). In a further example, the noise prediction is further modified to allow for an even more accurate training of the noise detector 510. Such a further modified noise prediction may be referred to as SDDNP with split.

To implement MA-DDNP, the equalized channel output is first characterized as:

$$y_k = s_k(a_{k-l}^k) + n_k(a_{k-M}^{k+\Delta}), \quad (1)$$

where $s_k$, $n_k$ and $a_k$ are the desired signal (i.e., signal component), noise component, and transmitted data bit respectively. The data-dependence of $s_k$ is made explicit in Equation (1), where $a_{k-l}^k$ is a shorthand notation for the sequence $\{a_{k-1}, \ldots, a_k\}$ and $l+1=N_p$ is the length of the target. The signal $s_k$ can be expressed as $$s_k(a_{k-l}^k) = \sum_{i=0}^{N_p-1} p_i a_{k-i}, \quad (2)$$

where $[p_0 \, p_1 \ldots p_{N_p-1}]$ are the target coefficients. Similarly, data-dependence of $n_k$ is denoted by $a_{k-M}^{k+\Delta}$, for some non-negative integers $\Delta$ and $M$ which denote the data-dependent length of the noise component. Denoting the predicted noise sample as $\hat{n}_k$ and the predictor error variance as $\sigma_p^2$, the branch metric in the trellis can be shown to be:

$$\ln \sigma_p(a_{k-M}^{k+\Delta}) + \frac{[y_k - \hat{n}_k(a_{k-M}^{k+\Delta}) - s_k(a_{k-l}^k)]^2}{2\sigma_p^2(a_{k-M}^{k+\Delta})}. \quad (3)$$

The predicted noise sample $\hat{n}_k$ is computed using Gauss-Markov theorem as follows:

$$\hat{n}_k(a_{k-M}^{k+\Delta}) = E\{n_k \mid a_{k-M}^{k+\Delta}\} + \sum_{i=1}^{L} f_i(a_{k-M}^{k+\Delta})[n_{k-i}(a_{k-i-l}^{k-i}) - E\{n_{k-i} \mid a_{k-i-M}^{k-i+\Delta}\}] \quad (4)$$

$$= E\{n_k \mid a_{k-M}^{k+\Delta}\} + \sum_{i=1}^{L} f_i(a_{k-M}^{k+\Delta})$$

$$[y_{k-i} - s_{k-i}(a_{k-i-l}^{k-i}) - E\{n_{k-i} \mid a_{k-i-M}^{k-i+\Delta}\}],$$

where $f_i$ denotes the noise predictor coefficients and $L$ is the length of the predictor (predictor order). The trellis state is given by $a_{k-max(M,1+L)}^{k+\Delta-1}$. Any additional data bits required before $a_{k-max(M,1+L)}$ is obtained through decision feedback. The number of states in the trellis is given by $2^{\Delta+max(1+L,M)}$. Further, the predictor error variance $\sigma_p^2$ is given by $$\sigma_p^2(a_{k-M}^{k+\Delta}) = E\{(n_k - \hat{n}_k(a_{k-M}^{k+\Delta}))^2\}. \quad (5)$$

Figure 7:
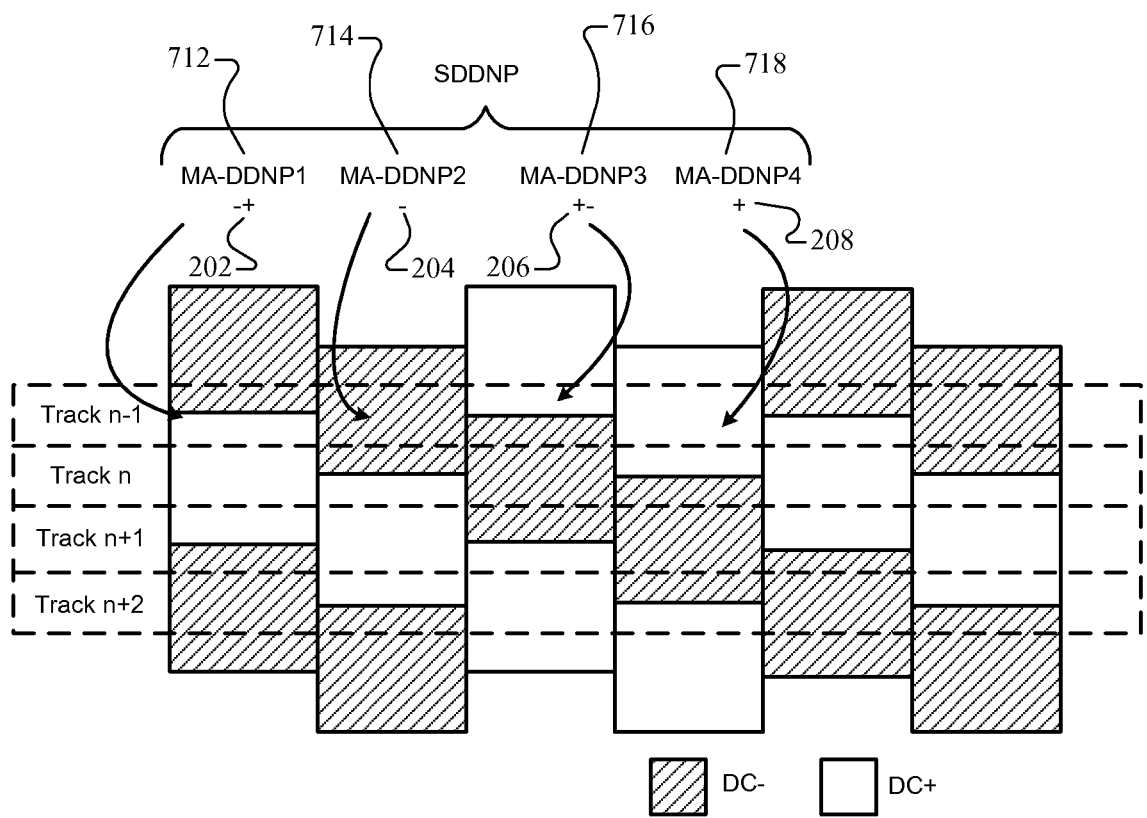
FIG. 7 depicts an example of the servo pattern stored on the servo layer as shown in FIG. 2, along with the corresponding noise prediction module for each of the types of servo patterns according to present disclosure.

Having described the conventional MA-DDP above, the SDDNP according to an example of the present disclosure will now be described. In particular, to implement SDDNP, the noise component is made to be dependent on the servo pattern in addition to the data pattern. In this regard, at least one noise prediction module is provided for each of a plurality of types of servo patterns of the servo layer 106. For example, as illustrated in the example of FIG. 7, there are four types of servo patterns (a DC−/DC+ servo pattern 202, a DC− servo pattern 204, a DC+/DC− servo pattern 206 and a DC+ servo pattern 208) in the servo layer 106, and one noise prediction module 712, 714, 716, 718 is provided for each of the types of servo patterns. The noise component is then predicted by, for each of a plurality of segments of the readback signal, using a selected one of the noise prediction modules 712, 714, 716, 718, whereby the selected one of the noise prediction module for a segment of the readback signal is selected based on the type of the servo pattern associated with the segment of the readback signal. That is, the servo pattern associated with the segment of the readback signal is the servo pattern being read from the servo layer when such a segment of the readback signal is being generated from the data recording layer 104.

In various examples, each of the plurality of types of servo patterns 202, 204, 206, 208 is assigned a respective servo bit ($b_k$), and the selected one of the noise prediction module for the segment of the readback signal is selected based on the servo bit of the type of the servo pattern associated with the segment of the readback signal. By way of an example only, denote $b_k$ to be the servo bit at time instant k, given by $$b_k = \begin{cases} 1, & \text{if } a_k \text{ is within servo pattern DC}-/\text{DC}+ \\ 2, & \text{if } a_k \text{ is within servo pattern DC}- \\ 3, & \text{if } a_k \text{ is within servo pattern DC}+/\text{DC}- \\ 4, & \text{if } a_k \text{ is within servo pattern DC}+ \end{cases}. \quad (6)$$

Subsequently, Equation (1) relating to the conventional MA-DDNP is modified to be:

$$y_k = s_k(a_{k-l}^k) + n_k(a_{k-M}^{k+\Delta}, b_k). \quad (7)$$

It can be observed from Equation (7) that the noise component $n_k$ is now dependent on the servo pattern (i.e., servo bit), in addition to the data pattern. Further, the branch metric in the trellis is now given by:

$$\ln \sigma_p(a_{k-M}^{k+\Delta}, b_k) + \frac{[y_k - \hat{n}_k(a_{k-M}^{k+\Delta}, b_k) - s_k(a_{k-l}^k)]^2}{2\sigma_p^2(a_{k-M}^{k+\Delta}, b_k)}. \quad (8)$$

The predicted noise sample $\hat{n}_k$ may be computed using Gauss-Markov theorem as follow:

$$\hat{n}_k(a_{k-M}^{k+\Delta}, b_k) = E\{n_k \mid a_{k-M}^{k+\Delta}, b_k\} + \sum_{i=1}^{L} f_i(a_{k-M}^{k+\Delta}, b_k) \quad (9)$$

$$[n_{k-i}(a_{k-i-l}^{k-i}) - E\{n_{k-i} \mid a_{k-i-M}^{k-i+\Delta}, b_k\}]$$

$$= E\{n_k \mid a_{k-M}^{k+\Delta}, b_k\} + \sum_{i=1}^{L} f_i(a_{k-M}^{k+\Delta}, b_k)$$

$$[y_{k-i} - s_{k-i}(a_{k-i-l}^{k-i}) - E\{n_{k-i} \mid a_{k-i-M}^{k-i+\Delta}, b_k\}],$$

where $f_i$ denotes the noise predictor coefficients and L is the length of the predictor as before. There are no changes to the trellis state, given by $\alpha_{k-max(M,1+L)}^{k+\Delta-1}$. There are also no changes to the number of states in the trellis, given by $2^{\Delta+max(1+L,M)}$. However, according to the example, it can be appreciated that a different set of predictor coefficients $f_i$ have to be used to compute the branch metric whenever the servo bit $b_k$ changes. Further, the predictor error variance $\sigma_p^2$ is given by:

$$\sigma_p^2(a_{k-M}^{k+\Delta}, b_k) = E\{(n_k - \hat{n}_k(a_{k-M}^{k+\Delta}, b_k))^2\}. \quad (10)$$

Accordingly, each noise prediction module is configured for a particular type of the plurality of types of servo patterns 202, 204, 206, 208, and such a noise prediction module comprises a plurality of predictor parameter sets, each predictor parameter set predetermined for a particular type of data pattern of the readback signal and the particular type of servo pattern. In other features, each predictor parameter set comprises a predictor coefficient and a predictor error variance predetermined for the particular type of data pattern and the particular type of servo pattern, and the predictor parameter set is used in determining the noise component associated with the readback signal in the channel. In an example, the predictor parameter sets are organized in the form of a look-up table (LUT).

For example, a LUT may be used for each type/state of the servo pattern of the servo layer. The type/state of the servo layer could be DC+ 202, DC− 204, DC+/DC− 206 or DC−/DC+ 208 corresponding to the 4 type/state of the servo pattern 200 as illustrated in FIG. 2. For each type/state of the servo pattern 200, a different DDNP LUT may be characterized and used during bits detection of the readback signal.

In Equation (6) above, the servo bit $b_k$ is chosen to take values 1, 2, 3, 4 as an example because of ease of implementation in retrieving the corresponding noise prediction module (including, SDDNP predictor coefficients and predictor error variances) from memory. Together, the servo bit $b_k$ and data pattern $a_{k-M}^{k+\Delta}$ help to provide the address locations of the predictor coefficients and predictor error variances. For example, let us denote a function f( ) which converts a data pattern $a_{k-M}^{k+\Delta}$ from its binary value to its decimal value. As an example, $f([a_{k+1}\ a_k\ a_{k-1}]=[1\ 0\ 1])=5$. This means that in conventional MA-DDNP, the predictor coefficients and predictor error variances of data pattern [1 0 1] are stored at memory location '5'. In SDDNP, the value of the servo bit $b_k$ helps to locate the memory location of the predictor coefficients corresponding to that particular servo bit and that particular data pattern. In particular, the memory location is given by $b_k * f(a_{k-M}^{k+\Delta})$. For example, data pattern $a_{k-M}^{k+\Delta}$ is [1 0 1] as before, but with servo bit $b_k$=2. Therefore, the memory location of the predictor coefficients with $b_k$=2 and $a_{k-M}^{k+\Delta}$=[1 0 1] is 2*5=10. Therefore, by defining an integer value for servo bit $b_k$, it is possible to directly compute the memory address of the DDNP coefficients (using $b_k$ and $a_{k-M}^{k+\Delta}$) in a single step, which eases implementation.

Without defining an integer value for $b_k$ (for example, an alternative definition for $b_k$ may be +−, +, and −+), although possible and within the scope of the present disclosure, the algorithm to retrieve the memory locations of the predictor coefficients becomes significantly more complex. A series of conditional statements (if else loops) are required which increases latency of the overall system.

It can be appreciated that SDDNP according to examples of the present disclosure requires larger memory storage. For example, in conventional MA-DDNP it is required to store $2^{\alpha+M+1}$ values of $\sigma_p$ in memory, whereas in the present SDDNP it is required to store $4*2^{\Delta+M+1}$ values of $\sigma_p$. Similarly, for the predictor coefficients $f_i$, it is required to store $L*2^{\Delta+M+1}$ values in memory using the conventional MA-DDNP. But using the present SDDNP, this number is increased to $4*L*2^{\Delta+M+1}$. In general, the memory storage of the present SDDNP is max($b_k$)=4 times more over conventional MA-DDNP. However, with large data storage capacity readily available, the increase in memory storage required can be accommodated in the interest of significant performance improvement over conventional DDNP.

In various examples, the servo bit of the type of servo pattern associated with a segment/section of the readback signal is identified from the segment of the readback signal or a position error signal from the servo layer. That is, to identify the servo bit corresponding to each data bit, the position error signal (PES) obtained from the servo may be used, or alternatively, only the readback signal may be used. In the case of identifying the servo bit corresponding to each data bit based on the PES signal, the underlying servo pattern can be identified from the PES signal, and subsequently the servo bit can be identified by a mapping from the servo pattern to the corresponding servo bit. In the case of identifying the servo bit corresponding to each data bit based on the readback signal only, a waveform is generated based on the segment of the readback signal (containing the data bit) and aligning the waveform with the segment of the readback signal.

Figure 8:
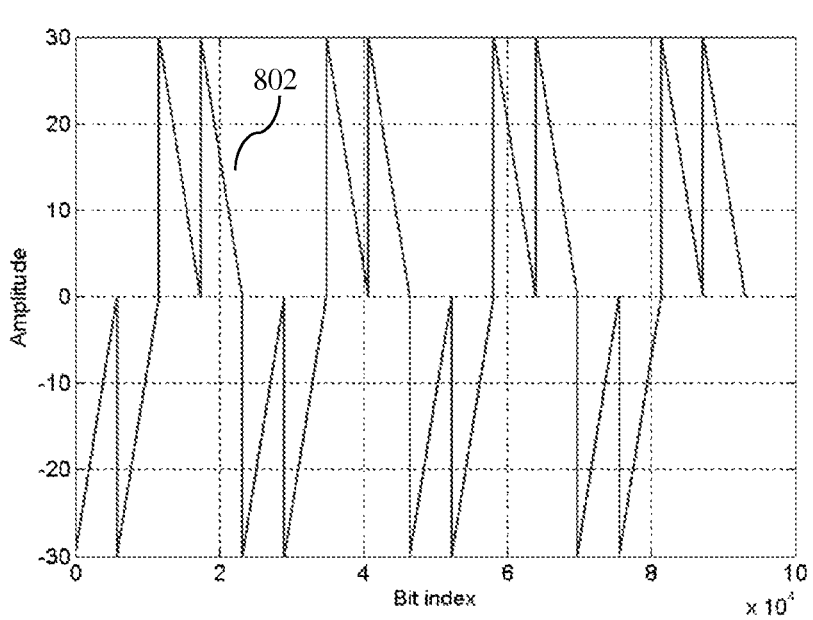
FIG. 8 depicts an example of a triangular waveform generated for identifying the servo bit corresponding to each segment of the readback signal according to the present disclosure.
Figure 9:
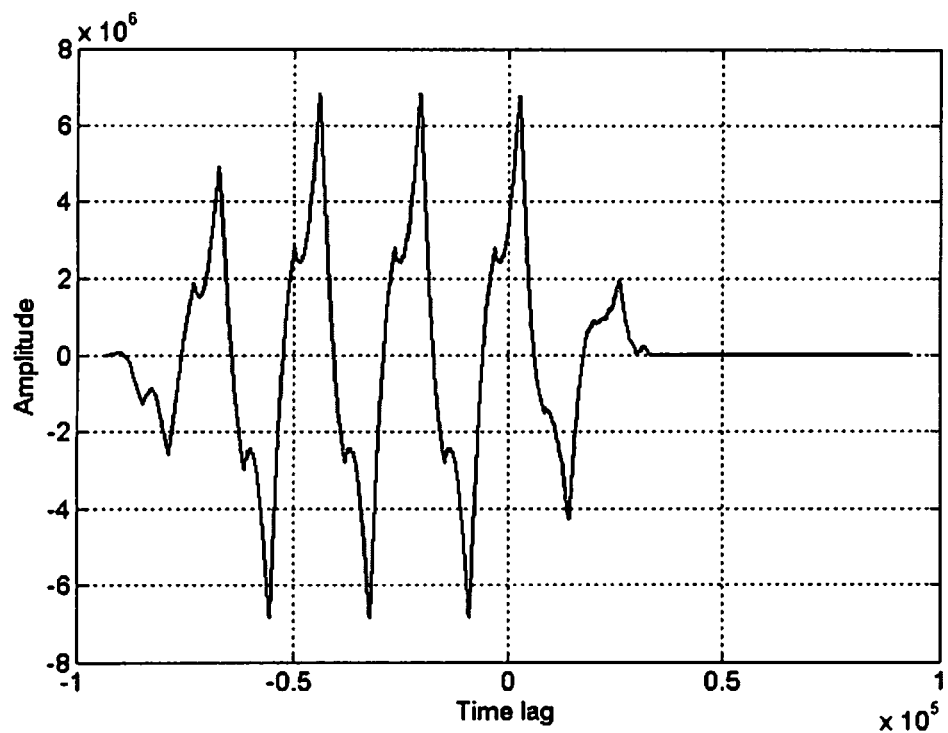
FIG. 9 shows an example of the time lag of maximum correlation obtained by computing the cross-correlation of the triangular waveform with the readback signal waveform.
Figure 10:
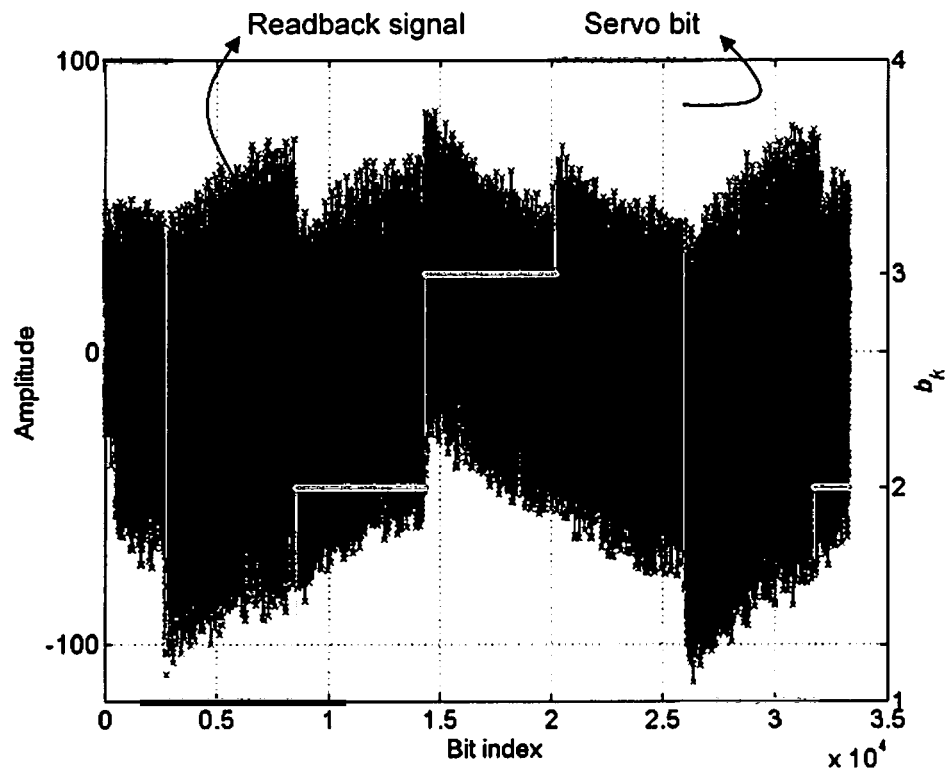
FIG. 10 shows an example of the mapping of each segment/section of the readback waveform for identifying the servo bits according to the present disclosure.

In an example, a triangular waveform 802 as shown in FIG. 8 is generated. The length of the base of each triangle in the triangle waveform 802 is given by the number of data bits corresponding to each servo pattern. The height of each triangle in the triangular waveform is obtained through a trial and error method. In this example, the height of the triangle is set to be 30. By computing the cross-correlation of this triangular waveform with the readback signal waveform (e.g., see FIG. 3), the time lag of maximum correlation can be identified and is shown in FIG. 9. For example, in FIG. 9, the time lag of maximum correlation can be identified to be −0.46*10⁵ discrete-time index. Thereafter, the triangular waveform 802 can be aligned with the readback signal at an offset of 0.46*10⁵ discrete-time index. Having done so, the servo bit corresponding to each segment/section of the readback signal can be identified using the triangular waveform. More specifically, in FIG. 8, the first upward-sloping triangle at bit index 0-0.6*10⁴ corresponds to servo bit $s_k=1$. The second upward-sloping triangle at bit index 0.6-1.2*10⁴ corresponds to servo bit $s_k=2$. The following downward-sloping triangle at bit index 1.2-1.8*10⁴ corresponds to $s_k=3$, and the subsequent downward-sloping triangle at bit index 1.8-2.4*10⁴ corresponds to $s_k=4$. The sequence repeats with a following upward-sloping triangle for $s_k=1$, and so on. In this manner, by mapping each segment/section of the readback waveform to a particular segment/section of the triangular waveform and finally to its corresponding servo bit, the servo bits can be identified from the readback signal accordingly, as shown in FIG. 10.

To demonstrate the enhanced performance of the SDDNP over the conventional MA-DDNP, a simulation conducted will now be described and the results shown in FIG. 11. In the simulation, the BER results of the conventional MA-DDNP and the present SDDNP are computed. In order to compute the BER results, a servo write current of 60 mA is used and the readback signal is obtained from the spinstand at linear densities of 1147, 1338, and 1529 kfci. A total of 20 data sectors, each comprising 32768 data bits and 511 pre-amble and 10 post-amble bits, are obtained. The frequency of the staggered servo pattern is 34.4 kHz. For equalization of the readback signal, a generalized partial response (GPR) equalizer 510 of length 51 is used. For the MA-DDNP and SDDNP detectors, the number of trellis states to be 64. To obtain the optimum target length $N_p$ and DDNP parameters $\Delta$, M, and L, all possible combinations are tried such that $2^{\Delta+max(1+L,M)}=64$. The combination of $N_p$, $\Delta$, M, and L that gives the lowest BER is then used. The simulation model is based on the block diagram as shown in FIG. 5.

Figure 11:
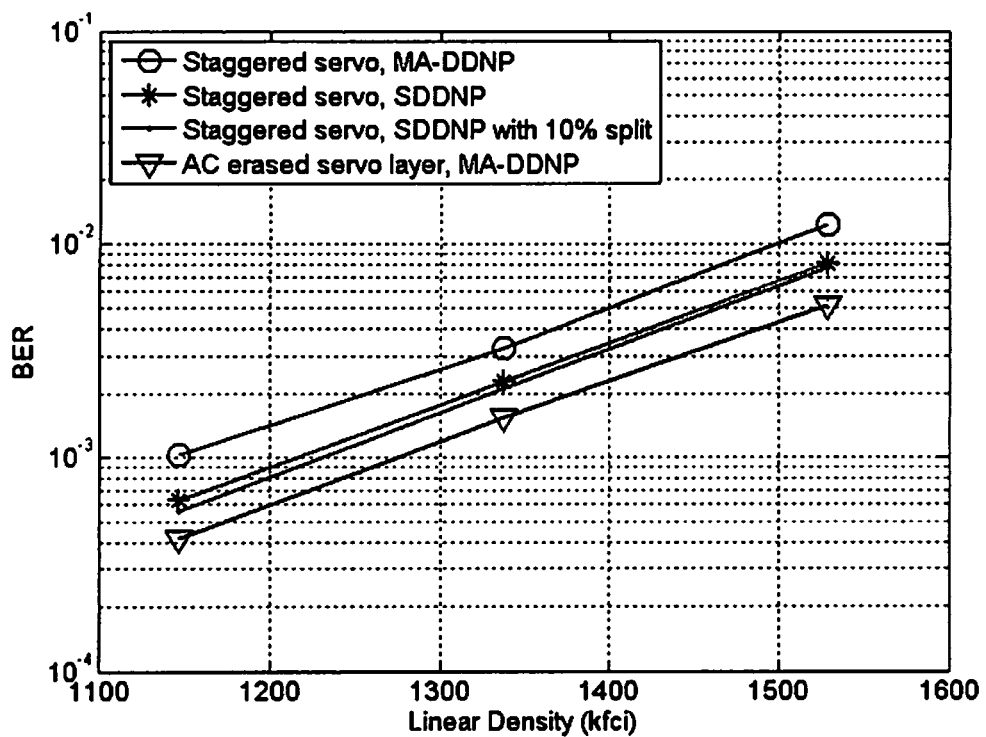
FIG. 11 illustrates an example of the BER results of the present SDDNP and SDDNP with split over the conventional MA-DDNP based on a simulation conducted.

FIG. 11 shows the BER results. It can be observed that SDDNP provides a superior performance over MA-DDNP. For example, at BER 10⁻³, SDDNP provides a 6.6% linear density gain over MA-DDNP. For comparison, the BER results of the data layer readback signal when the servo layer is AC erased is also included in FIG. 11. It can be observed that the BER of the data layer readback signal is lowest when the servo layer is AC erased. This may be expected because when the servo layer is AC erased, distortions arising from servo signal induced transition shift and transitions of servo signal from DC+/DC− to DC+ or DC− are not present. Comparing staggered with AC erased servo layer and MA-DDNP detector, the linear density loss is 10.5% at BER 10⁻³. However, when SDDNP is used, the linear density loss is reduced to 4.6%.

In the above example, one noise prediction module is provided for each of the plurality of types of servo patterns 202, 204, 206, 208 of the servo layer 106. That is, separate noise prediction modules (DDNPs) for different portions of the readback signal are configured or trained to obtain better performance. In a further example, the performance is further improved by training separate noise prediction modules within the same type of servo pattern. In other words, a plurality of noise prediction modules is provided for each of the plurality of types of servo patterns 202, 204, 206, 208 of the servo layer 106. In an example, each type of servo pattern is split/partitioned into a plurality of segments, and the at least one noise prediction module comprises a plurality of noise prediction modules, each noise prediction module configured for a particular segment of the type of servo pattern. For example, to implement SDDNP with split according to an example of the present disclosure, the servo bit $b_k$ may be denoted as:

$$b_k = \begin{cases} 1, & \text{if } a_k \text{ is within first } x\% \text{ of servo pattern DC-/DC+} \\ 2, & \text{if } a_k \text{ is within next } (100-x)\% \text{ of servo pattern DC-/DC+} \\ 3, & \text{if } a_k \text{ is within first } x\% \text{ of servo pattern DC-} \\ 4, & \text{if } a_k \text{ is within next } (100-x)\% \text{ of servo pattern DC-} \\ 5, & \text{if } a_k \text{ is within first } x\% \text{ of servo pattern DC+/DC-} \\ 6, & \text{if } a_k \text{ is within next } (100-x)\% \text{ of servo pattern DC+/DC-} \\ 7, & \text{if } a_k \text{ is within first } x\% \text{ of servo pattern DC+} \\ 8, & \text{if } a_k \text{ is within next } (100-x)\% \text{ of servo pattern DC+} \end{cases} \quad (11)$$

Figure 12:
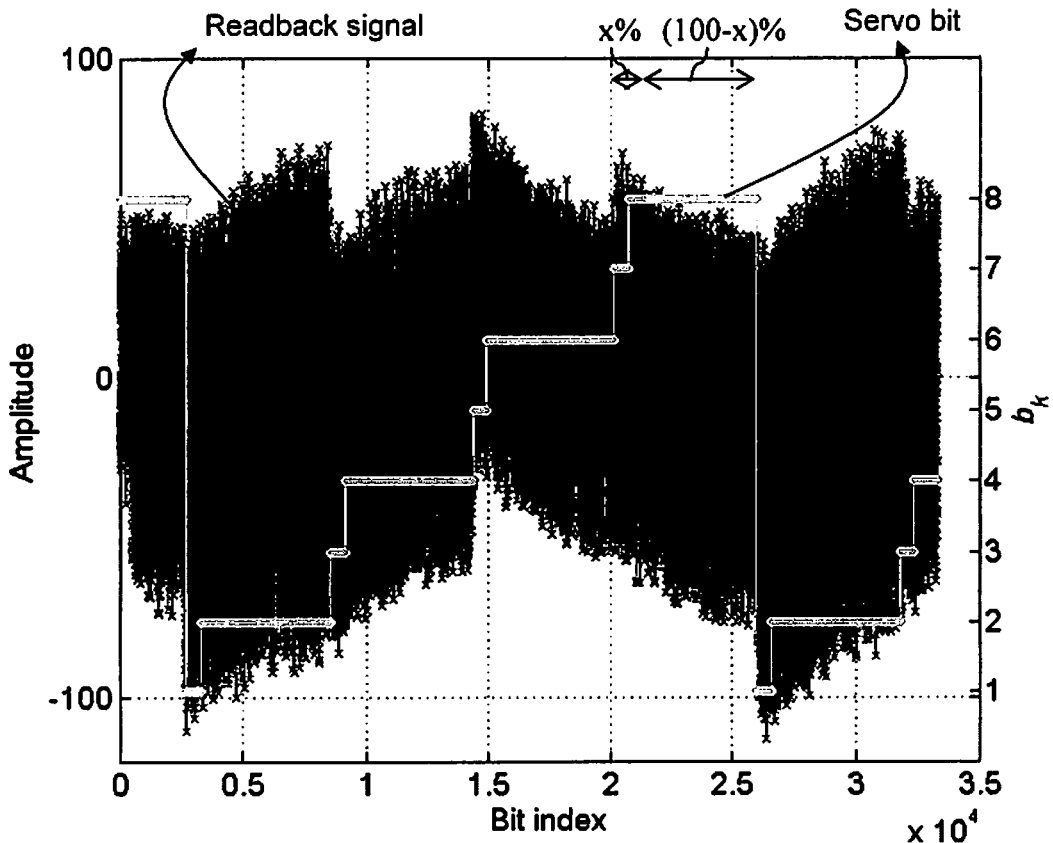
FIG. 12 shows an example of the mapping of further segments/sections of the readback waveform for identifying the servo bits according to the present disclosure.

This may be referred to as SDDNP with x % split. Equations (7)-(10) remain as stated hereinbefore. The memory location of the predictor coefficients and predictor error variances is given by $b_k*f(a_{k-M}^{k+\Delta})$ as stated hereinbefore. As an example, the servo bit with a 10% split is shown in FIG. 12. In general, the memory storage of SDDNP with x % split is $max(b_k)=8$ times more over conventional MA-DDNP.

Figure 13:
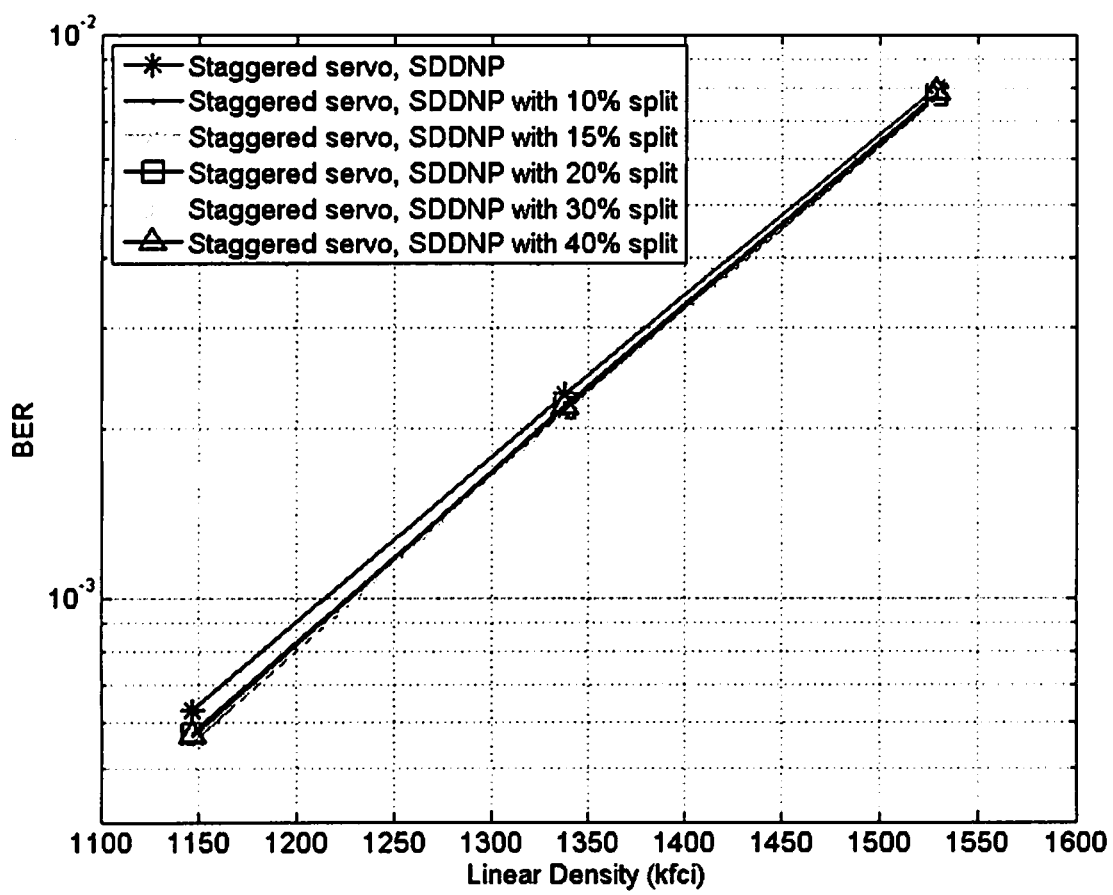
FIG. 13 illustrates an example of the BER results of SDDNP with x % split, where x=10, 15, 20, 30, and 40 based on a simulation conducted.

FIG. 13 shows the BER results of SDDNP with x % split, where x=10, 15, 20, 30, and 40. In general, SDDNP with x % split performs better than SDDNP. However, the results are very similar even when x is adjusted from 10 to 40. Therefore, according to a preferred example, SDDNP with about 10% split is used since this gives the lowest BER amongst the various values for x considered.

To compare SDDNP with SDDNP with 10% split, the results are incorporated in FIG. 11. It is noted that SDDNP provides a 6.6% linear density gain over MA-DDNP, but this gain in increased to 7.9% when SDDNP with 10% split is used. Further, it is noted that SDDNP with staggered servo suffers from a 4.6% linear density loss as compared to BER results of AC erased servo layer, but this loss is reduced to 3.5% when SDDNP with 10% split is used.

It has also been noted that the results shown in FIGS. 11 and 13 are highly dependent on the k-value of the dedicated servo medium. Here, the k-value indicates the interference from servo layer to data layer. The higher the k-value, the less the interference from servo to data layer. It will be appreciated that different dedicated servo medium with different k-value may exhibit different results from those presented herein.

Figure 14:
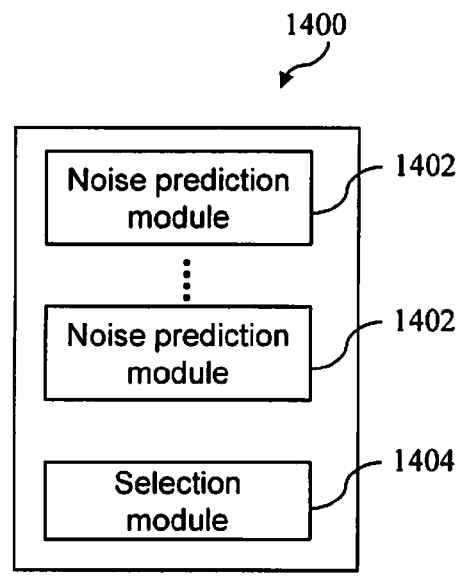
FIG. 14 depicts a schematic drawing of an example of a noise predictor for predicting a noise component associated with a readback signal in a channel from a dedicated servo medium, corresponding to the method as described with reference to FIG. 4.

According to an example, there is provided a noise predictor 1400 for predicting a noise component associated with a readback signal in a channel from a dedicated servo medium 102 comprising a data recording layer 104 and a servo layer 106, corresponding to the method 400 described with reference to FIG. 4 hereinbefore. As schematically illustrated in FIG. 14, the noise predictor 1400 comprises at least one noise prediction module 1402 for each of a plurality of types of servo patterns of the servo layer 106, and a selection module 1404 configured to, for each of a plurality of segments of the readback signal of the data recording layer 104, select one of the noise prediction modules for predicting the noise component, whereby the selected one of the noise prediction module for a segment of the readback signal is selected based on the type of the servo pattern associated with the segment of the readback signal. For example, the noise predictor 1400 may be incorporated in a bit detector 512 for detecting data bits from a readback signal in a channel from a dedicated servo medium 102. Further, according to an example, there is provided a method of detecting data bits from a readback signal in a channel from a dedicated servo medium 102, whereby the method of detecting data bits is based on a noise component associated with the readback signal predicted according to the method 400 as described hereinbefore with reference to FIG. 4.

An example of the present disclosure may be considered to generally involve three phases: 1) characterizing different SDDNP LUT's for each type/state of the servo pattern, 2) removing the linear distortion via synchronous averaging, and 3) detecting the readback signal waveform using a different LUT depending on which part of the servo pattern the servo head is over, and measuring/predicting the error rates. In practice, the first phase typically only needs to be carried out once at the initial HDD manufacturing stage. Such a HDD manufactured will then have the functionalities to carry out the second and third phases.

It will be appreciated to a person skilled in the art that the noise predictor 1400 and the noise detector 510 may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Some portions of the description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 15:
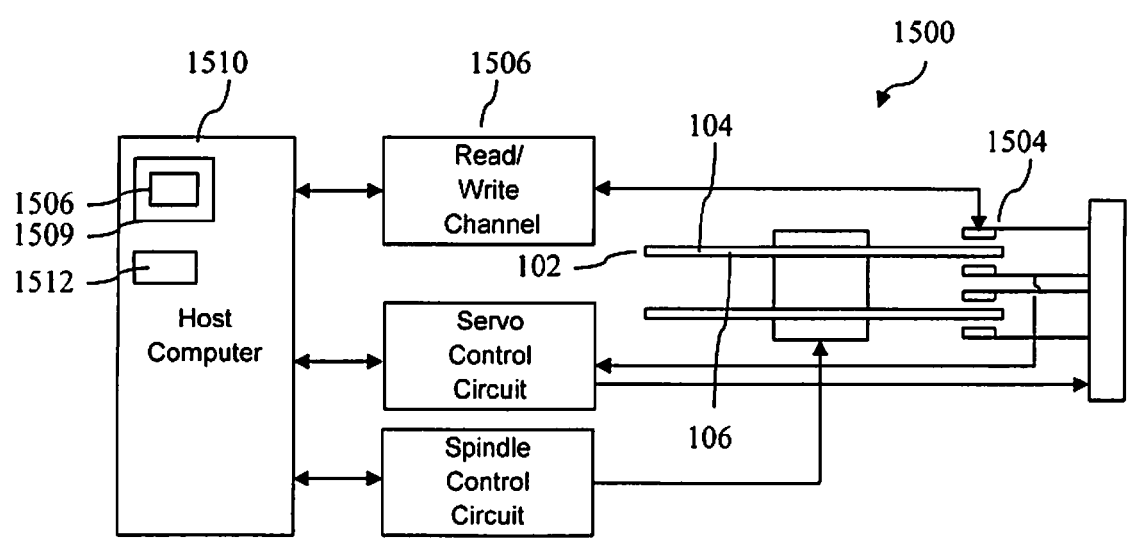
FIG. 15 depicts a schematic drawing of an example of a hard disk drive system according to present disclosure.

For illustration purposes only, FIG. 15 depicts a schematic drawing of a hard disk drive system 1500 according to an example of the present disclosure. The system 1500 comprises a dedicated servo medium 102 comprising a data recording layer 104 and a servo layer 106 (multiple layers not shown in FIG. 15 for simplicity, but shown in FIG. 1), a read head 1504 operable to read data from the data recording layer 104 and generate a readback signal of the data in a channel 1506, and a signal processing module 1508 configured to process the readback signal in the channel to output data bits detected from the readback signal. In particular, the signal processing module 1508 comprises the above-mentioned noise predictor 502 for predicting a noise component associated with the readback signal in the channel. For example, it will be appreciated that the signal processing module 1506 may be stored in a memory device/component 1509 of a host computer or controller 1510 and executable by a processor 1512.

While examples of the disclosure have been particularly shown and described with reference to specific examples, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of predicting a noise component associated with a readback signal in a channel from a dedicated servo medium, the dedicated servo medium comprising a data recording layer and a dedicated servo layer, the method comprising:
providing at least one noise prediction module for each of a plurality of types of servo patterns of the servo layer; and predicting the noise component by, for each of a plurality of segments of the readback signal of the data recording layer, using a selected one of the noise prediction modules,
  wherein the selected one of the noise prediction module for a segment of the readback signal is selected based on the type of the servo pattern associated with the segment of the readback signal.

2. The method of claim 1, wherein the servo pattern associated with the segment of the readback signal is the servo pattern being read from the servo layer when the segment of the readback signal is being generated from the data recording layer.

3. The method of claim 1, wherein each noise prediction module is configured for a particular type of the plurality of types of servo patterns, and the each noise prediction module comprises a plurality of predictor parameter sets, each predictor parameter set predetermined for a particular type of data pattern of the readback signal and the particular type of servo pattern.

4. The method of claim 3, wherein each predictor parameter set comprises a predictor coefficient and a predictor error variance predetermined for the particular type of data pattern and the particular type of servo pattern, and the predictor parameter set is used in determining the noise component associated with the readback signal in the channel.

5. The method of claim 3, wherein the predictor parameter sets are organized in the form of a look-up table.

6. The method of claim 1, wherein each of the plurality of types of servo patterns is assigned a respective servo bit, and the selected one of the noise prediction module for the segment of the readback signal is selected based on the servo bit of the type of the servo pattern associated with the segment of the readback signal.

7. The method of claim 6, wherein the servo bit of the type of servo pattern associated with the segment of the readback signal is identified from the segment of the readback signal or a position error signal from the servo layer.

8. The method of claim 7, wherein the servo bit of the type of servo pattern associated with the segment of the readback signal is identified from the segment of the readback signal by generating a waveform based on the segment of the readback signal and aligning the waveform with the segment of the readback signal.

9. The method of claim 1, wherein one noise prediction module is provided for each of the plurality of types of servo patterns of the servo layer.

10. The method of claim 1, wherein a plurality of noise prediction modules is provided for each of the plurality of types of servo patterns of the servo layer.

11. The method of claim 10, wherein each type of servo pattern is partitioned into a plurality of segments, and the at least one noise prediction module comprises a plurality of noise prediction modules, each noise prediction module configured for a particular segment of the type of servo pattern.

12. The method of claim 1, wherein the plurality of types of servo patterns comprises a DC−/DC+ servo pattern, a DC− servo pattern, a DC+/DC− servo pattern and a DC+ servo pattern.

13. A noise predictor for predicting a noise component associated with a readback signal in a channel from a dedicated servo medium, the dedicated servo medium comprising a data recording layer and a servo layer, the noise predictor comprising:
  at least one noise prediction module for each of a plurality of types of servo patterns of the servo layer; and
  a selection module configured to, for each of a plurality of segments of the readback signal of the data recording layer, select one of the noise prediction modules for predicting the noise component,
  wherein the selected one of the noise prediction module for a segment of the readback signal is selected based on the type of the servo pattern associated with the segment of the readback signal.

14. The noise predictor of claim 13, wherein the servo pattern associated with the segment of the readback signal is the servo pattern being read from the servo layer when the segment of the readback signal is being generated from the data recording layer.

15. The noise predictor of claim 13, wherein each noise prediction module is configured for a particular type of the plurality of types of servo patterns, and the each noise prediction module comprises a plurality of predictor parameter sets, each predictor parameter set predetermined for a particular type of data pattern of the readback signal and the particular type of servo pattern.

16. The noise predictor of claim 15, wherein each predictor parameter set comprises a predictor coefficient and a predictor error variance predetermined for the particular type of data pattern and the particular type of servo pattern, and the predictor parameter set is used in determining the noise component associated with the readback signal in the channel.

17. The noise predictor of claim 15, wherein the predictor parameter sets are organized in the form of a look-up table.

18. The noise predictor of claim 13, wherein each of the plurality of types of servo patterns is assigned a respective servo bit, and the selected one of the noise prediction module for the segment of the readback signal is selected based on the servo bit of the type of the servo pattern associated with the segment of the readback signal.

19. The noise predictor of claim 18, wherein the servo bit of the type of servo pattern associated with the segment of the readback signal is identified from the segment of the readback signal or a position error signal from the servo layer.

20. The noise predictor of claim 19, wherein the servo bit of the type of servo pattern associated with the segment of the readback signal is identified from the segment of the readback signal by generating a waveform based on the segment of the readback signal and aligning the waveform with the segment of the readback signal.

21. The noise predictor of claim 13, wherein one noise prediction module is provided for each of the plurality of types of servo patterns of the servo layer.

22. The noise predictor of claim 13, wherein a plurality of noise prediction modules is provided for each of the plurality of types of servo patterns of the servo layer.

23. The noise predictor of claim 22, wherein each type of servo pattern is partitioned into a plurality of segments, and the at least one noise prediction module comprises a plurality of noise prediction modules, each noise prediction module configured for a particular segment of the type of servo pattern.

24. The noise predictor of claim 13, wherein the plurality of types of servo patterns comprises a DC−/DC+ servo pattern, a DC− servo pattern, a DC+/DC− servo pattern and a DC+ servo pattern.

25. A method of detecting data bits from a readback signal in a channel from a dedicated servo medium comprising a data recording layer and a servo layer, wherein the method of detecting data bits is based on a noise component associated with the readback signal predicted according to the method of any one of claims 1 to 12.

26. A hard disk drive system comprising:
- a dedicated servo medium comprising a data recording layer and a servo layer;
- a read head operable to (i) read data from the data recording layer, and (ii) generate a readback signal of the data in a channel; and
- a signal processing module configured to process the readback signal in the channel to output data bits detected from the readback signal, wherein the signal processing module comprises noise predictor according to any one of claims 13 to 24 for predicting a noise component associated with the readback signal in the channel.

* * * * *